Patented Nov. 10, 1953

2,658,890

UNITED STATES PATENT OFFICE 2,658,890

5-ALKOXYMETHYLENE RHODANINES

Willard J. Croxall, Elkhart, Ind., and Chien-Pen Lo, Philadelphia, Pa., assignors to Rohm & Haas Company, Philadelphia, Pa., a corporation of Delaware No Drawing. Application April 13, 1951,
Serial No. 220,993

17 Claims. (Cl. 260—240)

1

This invention deals with 5-alkoxymethylene rhodanines and with a process whereby these compounds are prepared.

It has heretofore been suggested that rhodanines be reacted with anhydrides of monocarboxylic acids or with ortho esters of such acids under the influence of a strong base as catalyst. The products which result from this reaction are methylidyne bis-rhodanines, compounds in which two identical rhodanine groups are joined by a —CH= linkage.

It has now been found that rhodanines react with alkyl orthoformates by heating rhodanine and orthoformate together in the presence of an anhydride of a lower monocarboxylic acid as a condensing agent to form an alkoxymethylene rhodanine. The reaction is effected between about 100° and about 200° C. and may be performed in the presence of an inert organic solvent such as xylene or naphtha. Also as solvent there may be used an excess of the condensing agent. The product can be separated by cooling the reaction mixture and filtering off the solid which has formed and freeing it from solvent. The compounds thus obtained are 5-alkoxymethylene rhodanines. These are useful as insecticides, rubber accelerators, dye intermediates, and intermediates for numerous derivatives, among which are pharmaceutically useful substances.

As rhodanines there may be used any of the compounds of the formula

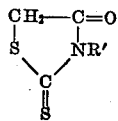

where R' represents hydrogen or a hydrocarbon group including aliphatic, cycloaliphatic, aryl, and aralkyl groups, particularly such a group of not over ten carbon atoms. The group R' may also take the form of a divalent hydrocarbon group which joins together two rhodanine cycles, thus

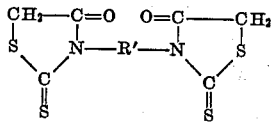

Typical of R' as a bivalent radical are the alkylene groups ethylene, propylene, butylene, and 1,2-hexylene, or other alkylene groups and cycle containing groups such as phenylene. When R' is monovalent, it may be a hydrocarbon group

2 such as methyl, ethyl, isopropyl, butyl, amyl, hexyl, octyl, nonyl, decyl, allyl, methallyl, crotyl, octenyl, 5,5-dimethyl-2-hexenyl, cyclohexyl, methylcyclohexyl, phenyl, methylphenyl, butylphenyl, naphthyl, benzyl, methylbenzyl, phenylethyl, etc.

The orthoformate reacted with a rhodanine is preferably a lower alkyl orthoformate, $(RO)_3CH$, R being here a lower alkyl group, methyl, ethyl, propyl, or butyl. R may also be a larger alkyl group, particularly of a size up to nine carbon atoms. Methyl and ethyl orthoformates are preferred reactants, as they are economical and convenient to use.

First choice for the condensing agent is acetic anhydride. Other anhydrides, such as propionic anhydride and butyric anhydride, are also effective and may be used.

This invention is illustrated by the following examples showing preparation of typical alkoxymethylene rhodanines. Parts are by weight unless otherwise designated.

Example 1

A mixture of 140 parts of rhodanine, 179 parts of ethyl orthoformate, and 325 parts of acetic anhydride was heated under reflux for 17.5 hours. The reaction mixture was cooled. Wine-red crystals formed. They were filtered off and dried. The product amounted to 118 parts. It melted at 152°–155° C., but upon recrystallization it melted at 157°–158° C. It contained 7.3% of nitrogen and 34.3% of sulfur and had a molecular weight of 190, thus corresponding in composition to 5-ethoxymethylene rhodanine,

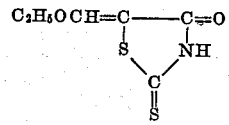

for which the theoretical nitrogen and sulfur values are 7.4% and 33.8% respectively and the theoretical molecular weight is 189.

Example 2

A mixture of 30 parts of 3-methyl rhodanine, 36 parts of ethyl orthoformate, and 65 parts of acetic anhydride was heated under reflux for 23 hours. When the reaction mixture was cooled, long needle crystals formed, which were filtered off, washed with acetic acid, and air-dried. These crystals, purple in color and amounting to 28 parts, melted at 131°–133° C. They were recrystallized from acetic acid and then melted at 132°–133° C. Analysis of the product showed the presence of 6.8% of nitrogen and 31.2% of sulfur with a molecular weight of 202. The product thus corresponds in composition to 5-ethoxymethylene 3-methyl rhodanine, theoretical values for which are 6.9% of nitrogen, and 31.5% of sulfur, and 202 for molecular weight.

Example 3

A mixture of 16 parts of 3,3'-ethylene bis-rhodanine, 22.5 parts of ethyl orthoformate, and 41 parts of acetic anhydride was heated under reflux for 24 hours. The reaction mixture was cooled with formation of a solid. The solid was filtered off, washed with acetic acid, and dried. The product thus obtained melted at 201°–204° C. Upon recrystallization from acetic acid it melted at 205°–207° C. It was a purple crystalline solid which corresponded in composition to 3,3'-ethylene bis(5-ethoxymethylene rhodanine), having by analysis a nitrogen content of 6.9% and a sulfur content of 31.8% (theory 6.95% and 31.8% respectively). The structural formula of this compound is

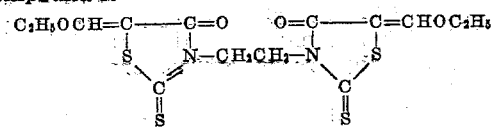

In place of 3,3'-ethylene bis-rhodanine other bis-rhodanines may be used, such as 3,3'-(1,2-propylene)bis-rhodanine, 3,3'-butylene bis-rhodanine, 3,3'-(1,2-hexylene)bis-rhodanine, and the like. It is preferred that the alkylene group linking two rhodanine nuclei contain not over six carbon atoms.

Example 4

A mixture of 21 parts of 3-phenyl rhodanine, 18 parts of ethyl orthoformate, and 31 parts of acetic anhydride was heated under reflux for 18 hours. When the reaction mixture was cooled, reddish crystals formed. They were filtered off, washed with acetic acid, and dried. The dried product amounted to 18 parts and melted at 150°–152° C. It was recrystallized from acetic acid to give a crystalline orange-colored solid which melted at 153°–155° C. By analysis it contained 5.3% of nitrogen and 24.7% of sulfur, corresponding in composition to 5-ethoxymethylene 3-phenyl rhodanine. The theoretical nitrogen and sulfur contents for this compound are 5.3% and 24.2% respectively.

Example 5

A mixture of 80 parts of rhodanine, 81 parts of methyl orthoformate, and 185 parts of acetic anhydride was heated under reflux for 24 hours and then allowed to cool. Crystals formed, were separated, were washed with acetic acid, and were air-dried. The product amounted to 32 parts and decomposed when heated to 196° C. It contained 8.1% of nitrogen and 37.0% of sulfur, corresponding in composition to 5-methoxymethylene rhodanine.

Example 6

There was heated under reflux for 24 hours a mixture of 22 parts of 3-benzyl rhodanine, 20 parts of ethyl orthoformate, and 35 parts of acetic anhydride. When the reaction mixture was cooled, dark brownish-reddish colored crystals formed. These were separated, washed with acetic acid, and air-dried. The product melted at 160°–165° C. and corresponded in composition to 5-ethoxymethylene 3-benzyl rhodanine.

Example 7

There were mixed 21.5 parts of 3-cyclohexyl rhodanine, 20 parts of ethyl formate, and 30 parts of acetic anhydride. The mixture was heated under reflux for 24 hours and then cooled. Crystals formed and were separated. They were filtered off, washed with acetic acid, and dried. They corresponded in composition to 5-ethoxymethylene 3-cyclohexyl rhodanine.

Example 8

There were mixed 19 parts of 3-(2-butenyl) rhodanine, 21 parts of ethyl orthoformate, and 32 parts of acetic anhydride. This mixture was heated for 24 hours under reflux and allowed to cool. Deep brownish crystals formed, were filtered off, and were dried. They corresponded in composition to 5-ethoxymethylene 3-(2-butenyl) rhodanine.

Example 9

There were mixed together 26 parts of 3-(3,5,5-trimethylhexyl) rhodanine, 30 parts of ethyl formate, and 45 parts of acetic anhydride. The mixture was heated for 24 hours under reflux. The reaction mixture was cooled and poured into water. An oil separated, was taken off, and dried over sodium sulfate. The dried oil was stripped at low pressure by heating on a steam bath. The product solidified on standing to give a bright red solid which melted at 39°–41° C. It corresponded in composition to 5-ethoxymethylene 3-(3,5,5-trimethylhexyl) rhodanine.

Example 10

A mixture of 15 parts of 3-methyl rhodanine, 28 parts of butyl orthoformate, and 50 parts of acetic anhydride was heated under reflux for 24 hours. When the reaction mixture was cooled, a solid separated, which was filtered off, rinsed with acetic acid, and air-dried. The product corresponds in composition to 5-butoxymethylene 3-methyl rhodanine.

The reaction of rhodanines of the formula

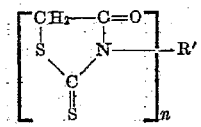

where $n$ is an integer having a value of one when R' is monovalent and a value of two when R' is divalent, and an alkyl orthoformate in the presence of an anhydride of a carboxylic acid yields products of the structure

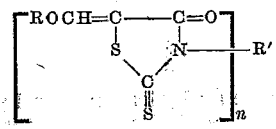

The alkoxymethylene derivatives are very active compounds and for this reason are of great value as chemical intermediates. They react with compounds which have a reactive hydrogen atom.

For example, an alkoxymethylene rhodanine reacts with a rhodanine having hydrogens in the 5-position under the influence of a basic catalyst, such as a tertiary amine, to give methylidyne bis-rhodanines

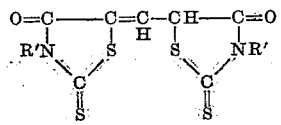

The two R's may be the same or different. This reaction is of particular importance for preparing unsymmetrical bis-rhodanines which have not been available heretofore.

Another useful reaction of the alkoxymethylene rhodanines is that with amines having a hydrogen atom on the amino nitrogen, aminomethylidyne rhodanines resulting.

While the above reaction has been shown as directed to rhodanines, it must be pointed out that a comparable reaction can be obtained with thiazolidinediones, but yields of comparable products are low.

We claim:

1. A process for preparing 5-alkoxymethylene rhodanines which comprises reacting by heating together between about 100° and about 200° C. in the presence of an anhydride of a lower saturated aliphatic monocarboxylic acid an alkyl orthoformate, the alkyl group of which contains not over nine carbon atoms, and a rhodanine from the class consisting of rhodanines of the formulae

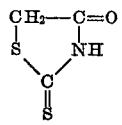

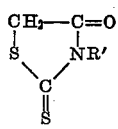

wherein R' is a hydrocarbon group of not over 10 carbon atoms, and

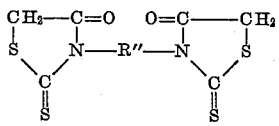

wherein R'' is an alkylene group of not over six carbon atoms.

2. A process for preparing a 5-alkoxymethylene rhodanine which comprises reacting by heating together between about 100° and about 200° C. in the presence of acetic anhydride and alkyl orthoformate, the alkyl group of which contains not over nine carbon atoms, and rhodanine.

3. A process for preparing 5-alkoxymethylene rhodanines which comprises reacting by heating together between about 100° and about 200° C. in the presence of an anhydride of a lower saturated aliphatic monocarboxylic acid an alkyl orthoformate, the alkyl group of which contains not over two carbon atoms, and a rhodanine of the formula

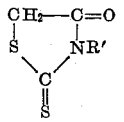

wherein R' is a hydrocarbon group of not over ten carbon atoms.

4. A process for preparing 3,3'-alkylene-bis (5-alkoxymethylene rhodanine) which comprises reacting by heating together between about 100° and about 200° C. in the presence of acetic anhydride an alkyl orthoformate, the alkyl group of which contains not over two carbon atoms, and a 3,3'-alkylene bis-rhodanine, the alkylene group of which contains not over six carbon atoms.

5. A process for preparing 3,3'-ethylene-bis (5-ethoxy-methylene rhodanine) which comprises reacting by heating together between about 100° and about 200° C. in the presence of acetic anhydride ethyl orthoformate and 3,3'-ethylene bis-rhodanine.

6. A process for preparing 5-ethoxymethylene rhodanine which comprises reacting by heating together between about 100° and about 200° C. in the presence of acetic anhydride ethyl orthoformate and rhodanine.

7. A process for preparing 5-ethoxymethylene 3-methyl rhodanine which comprises reacting by heating together between about 100° and about 200° C. in the presence of acetic anhydride ethyl orthoformate and 3-methyl rhodanine.

8. A process for preparing 5-ethoxymethylene 3-phenyl rhodanine which comprises reacting by heating together between about 100° and about 200° C. in the presence of acetic anhydride ethyl orthoformate and 3-phenyl rhodanine.

9. As new chemical compounds, 5-alkoxymethylene rhodanines from the class consisting of compounds of the structures

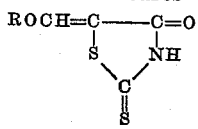

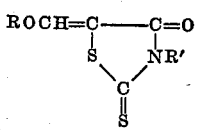

and

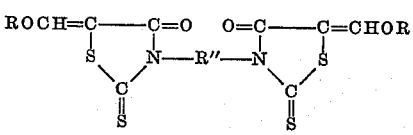

wherein R is an alkyl group of not over nine carbon atoms, R' is a hydrocarbon group of not over 10 carbon atoms, and R'' is an alkylene group of not over six carbon atoms.

10. A process for preparing 5-ethoxymethylene 5-nonyl rhodanine which comprises reacting by heating together between about 100° and about 200° C. in the presence of acetic anhydride ethyl orthoformate and 3-nonyl rhodanine.

11. As new chemical compounds, 5-alkoxymethylene rhodanines of the formula

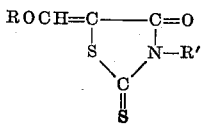

wherein R is an alkyl group of not over nine carbon atoms and R' is a monovalent hydrocarbon group of not over ten carbon atoms.

12. As a new chemical compound, 5-ethoxymethylene 3-methyl rhodanine.

13. As a new chemical compound, 5-ethoxymethylene 3-phenyl rhodanine.

14. As a new chemical compound, 5-ethoxymethylene 5-nonyl rhodanine.

15. As new chemical compounds, 5-alkoxymethylene rhodanines of the formula

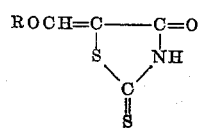

wherein R is an alkyl group of not over two carbon atoms.

16. As new chemical compounds, 3,3'-alkylene bis(5-alkoxymethylene rhodanines) of the formula

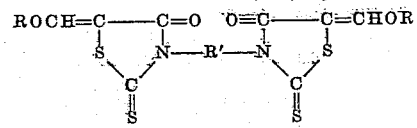

wherein R is an alkyl group of not over two carbon atoms and R' is an alkylene group of not over six carbon atoms.

17. As a new chemical compound, 3,3'-ethylene bis(5-ethoxymethylene rhodanine).

WILLARD J. CROXALL.
CHIEN-PEN LO.

References Cited in the file of this patent

UNITED STATES PATENTS

| Number | Name | Date |
| --- | --- | --- |
| 2,099,374 | Schwarz | Nov. 16, 1937 |

OTHER REFERENCES

Cook et al.: Jr. Chem. Soc. (London), Feb. 1948, pp. 201 to 206.

Chemical Abstracts, vol. 6, p. 3423 citing Graz, Monatsh. 33, pp. 941-965.